United States Patent
Singh et al.

(10) Patent No.: US 12,198,048 B2
(45) Date of Patent: Jan. 14, 2025

(54) MODALITY ADAPTIVE INFORMATION RETRIEVAL

(71) Applicant: Adobe Inc., San Jose, CA (US)

(72) Inventors: Hrituraj Singh, Uttar Pradesh (IN); Jatin Lamba, Haryana (IN); Denil Pareshbhai Mehta, Gujarat (IN); Balaji Vasan Srinivasan, Karnataka (IN); Anshul Nasery, Maharashtra (IN); Aishwarya Agarwal, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 1006 days.

(21) Appl. No.: 17/153,130

(22) Filed: Jan. 20, 2021

(65) Prior Publication Data
US 2022/0230061 A1    Jul. 21, 2022

(51) Int. Cl.
  *G06F 16/24*  (2019.01)
  *G06F 16/242*  (2019.01)
  *G06F 18/214*  (2023.01)
  *G06F 18/22*  (2023.01)
  *G06F 40/20*  (2020.01)
  *G06N 3/045*  (2023.01)
  (Continued)

(52) U.S. Cl.
  CPC ............ *G06N 3/08* (2013.01); *G06F 16/243* (2019.01); *G06F 18/214* (2023.01); *G06F 18/22* (2023.01); *G06F 40/20* (2020.01); *G06N 3/045* (2023.01); *G06V 30/40* (2022.01)

(58) Field of Classification Search
None
See application file for complete search history.

(56) References Cited

U.S. PATENT DOCUMENTS

2021/0064879 A1* 3/2021 Gupta .............. G06V 30/19173
2022/0230061 A1* 7/2022 Singh .................... G06F 16/243
(Continued)

OTHER PUBLICATIONS

Kelvin Guu; Real: Retrieval-Augmented Language Model Pre-Training; PMLR; 2020. pp. 1-10 (Year: 2020).*
(Continued)

*Primary Examiner* — Albert M Phillips, III
*Assistant Examiner* — Ja M
(74) *Attorney, Agent, or Firm* — Kilpatrick Townsend & Stockton LLP

(57) ABSTRACT

In some embodiments, a multimodal computing system receives a query and identifies, from source documents, text passages and images that are relevant to the query. The multimodal computing system accesses a multimodal question-answering model that includes a textual stream of language models and a visual stream of language models. Each of the textual stream and the visual stream contains a set of transformer-based models and each transformer-based model includes a cross-attention layer using data generated by both the textual stream and visual stream of language models as an input. The multimodal computing system identifies text relevant to the query by applying the textual stream to the text passages and computes, using the visual stream, relevance scores of the images to the query, respectively. The multimodal computing system further generates a response to the query by including the text and/or an image according to the relevance scores.

19 Claims, 8 Drawing Sheets

(51) Int. Cl.
G06N 3/08 (2023.01)
G06V 30/40 (2022.01)

(56) References Cited

U.S. PATENT DOCUMENTS

| | | | | |
|---|---|---|---|---|
| 2023/0116969 A1* | 4/2023 | Zhao | ...................... | G06F 16/438 707/722 |
| 2023/0280985 A1* | 9/2023 | Hayashi | .................... | G06F 8/10 717/104 |

OTHER PUBLICATIONS

Guido Zuccon; Integrating and Evaluating Neural Word Embeddings in Information Retrieval; ACM; pp. 1-8 (Year: 2015).*
Nishida et al., Multi-Style Generative Reading Comprehension, In Proceedings of the 57th Annual Meeting of the Association for Computational Linguistics, Florence, Italy: Association for Computational Linguistics, 2019, pp. 2273-2284.
Anderson et al., Bottom-up and Top-down Attention for Image Captioning and Visual Question Answering, 2018 IEEE/CVF Conference on Computer Vision and Pattern Recognition, Jun. 18-23, 2018, pp. 6077-6086.
Antol et al., VQA: Visual Question Answering, Proceedings of the IEEE International Conference on Computer Vision, 2015, pp. 2425-2433.
Chaudhry et al., Leaf-qa: Locate, Encode & Attend for Figure Question Answering, 2020 IEEE Winter Conference on Applications of Computer Vision (WACV), Mar. 2020, pp. 1-10.
Chen et al., Uniter: Learning Universal Image-text Representations, arXiv:1909.11740 [cs. CV], Available Online at: https://arxiv.org/abs/1909.11740, 2019, 26 pages.
Cho et al., Adversarial Tableqa: Attention Supervision for Question Answering on Tables, Proceedings of Machine Learning Research, vol. 95, 2018, pp. 391-406.
Choi et al., QuAC: Question Answering in Context, Empirical Methods in Natural Language Processing., 2018, pp. 2174-2184.
Dale, Audiovisual Methods in Teaching, New York: Dryden, 1969, pp. 1-3.
Das et al., Visual Dialog, Proceedings of the IEEE Conference on Computer Vision and Pattern Recognition, 2017, pp. 326-335.
Devlin et al., Bert: Pre-training of Deep Bidirectional Transformers for Language Understanding, arXiv:1810.04805, Available Online at: https://arxiv.org/abs/1810.04805, 2018, 16 pages.
Fayek et al., Temporal Reasoning Via Audio Question Answering, IEEE/ACM Transactions on Audio, Speech, and Language Processing, 2020, 12 pages.
Feng et al., Visual Information in Semantic Representation, The 2010 Annual Conference of the North American Chapter of the Association for Computational Linguistics, Jun. 2010, pp. 91-99.
Goyal et al., Making the V in vqa Matter: Elevating the Role of Image Understanding in Visual Question Answering, Proceedings of the IEEE Conference on Computer Vision and Pattern Recognition, 2017, pp. 6904-6913.
Hannan et al., Modality Disambiguation and qa Over Diverse Inputs, AAAI, Available Online at: https://arxiv.org/pdf/2001.08034.pdf, 2020, pp. 7879-7886.
Hermann et al., Teaching Machines to Read and Comprehend, NIPS'15: Proceedings of the 28th International Conference on Neural Information Processing Systems, vol. 1, Dec. 2015, pp. 1-14.
Hirschman et al., Deep Read: A Reading Comprehension System, Proceedings of the 37th annual meeting of the Association for Computational Linguistics, Jun. 1999, pp. 325-332.
Horev, Bert Explained: State of the Art Language Model for NLP, Towards Data Science, Available Online at: https://towardsdatascience.com/bert-explained-state-of-the-art-language-model-for-nlp-f8b21a9b6270, Nov. 10, 2018, 7 pages.
Jauhar, Tables as Semi-structured Knowledge for Question Answering, Proceedings of the 54th Annual Meeting of the Association for Computational Linguistics, vol. 1, 2016, pp. 474-483.
Kafle et al., Answering Questions About Data Visualizations Using Efficient Bimodal Fusion, The IEEE Winter Conference on Applications of Computer Vision, 2020, pp. 1498-1507.
Kafle et al., Dvqa: Understanding Data Visualizations via Question Answering, 2018 IEEE/CVF Conference on Computer Vision and Pattern Recognition, 2018, pp. 5648-5656.
Kahou et al., Figureqa: An Annotated Figure Dataset for Visual Reasoning, International Conference on Learning Representations, 2018, 20 pages.
Kocisky et al., The NarrativeQA Reading Comprehension Challenge, Transactions of the Association for Computational Linguistics, vol. 6, May 2018, pp. 317-328.
Kwiatkowski et al., Natural Questions: A Benchmark for Question Answering Research, Transactions of the Association of Computational Linguistics, 2019, 14 pages.
Lei et al., Tvqa: Localized, Compositional Video Question Answering, arXiv:1809.01696, Available Online at:, 2018, 13 pages.
Lu et al., Hierarchical Question-image Co-attention for Visual Question Answering, Advances in neural information processing systems, 2016, pp. 289-297.
Lu et al., Vilbert; Pretraining Task-agnostic Visi-olinguistic Representations for Vision-and-language Tasks, Advances in Neural Information Processing Systems, 2019, pp. 13-23.
Mihaylov et al., Can a Suit of Armor Conduct Electricity? A New Dataset for Open Book Question Answering, arXiv:1809.02789, Available Online at: https://arxiv.org/pdf/1809.02789.pdf, 2018, 14 pages.
Moreno et al., Interactive Multimodal Learning Environments, Educational psychology review, vol. 19, No. 3, 2007, pp. 309-326.
Li, et al., Multi-Modal Sentence Summarization With Modality Attention And Image Filtering, Proceedings of the Twenty-Seventh International Joint Conference on Artificial, 2018, pp. 4152-4158.
Nguyen et al., Ms Marco: A Human-generated Machine Reading Comprehension Dataset, arXiv:1611.09268, Available Online at: http://ceurws.org/Vol1773/CoCoNIPS_2016_paper9.pdf, 2016, 10 pages.
Nogueira et al., Passage Re-ranking with Bert, arXiv:1901.04085, 2019, 5 pages.
Pasupat et al., Compositional Semantic Parsing on Semi-structured Tables, arXiv:1508.0030, Available Online at: https://arxiv.org/pdf/1508.00305.pdf, 2015, 11 pages.
Rajpurkar et al., Know What You Don't Know: Unanswerable Questions for SQuAD, arXiv:1806.03822, Available Online at: https://arxiv.org/pdf/1806.03822.pdf, Jun. 11, 2018, 9 pages.
Rajpurkar et al., SQuAD: 100,000+ Questions for Machine Comprehension of Text, Proceedings of the Conference on Empirical Methods in Natural Language Processing, Available online at: https://doi.org/10.18653/v1/D16-1264, Oct. 11, 2016, pp. 2383-2392.
Reddy et al., Coqa: A Conversational Question Answering Challenge, Transactions of the Association for Computational Linguistics, vol. 7, Mar. 2019, pp. 249-266.
Richardson et al., Mctest: A Challenge Dataset for the Open-domain Machine Comprehension of Text, Proceedings of the 2013 Conference on Empirical Methods in Natural Language Processing, Oct. 2013, pp. 193-203.
Sankey et al., Engaging Students Through Multimodal Learning Environments: The Journey Continues, Proceedings ASCILITE 2010: 27th annual conference of the Australasian Society for Computers in Learning in Tertiary Education: curriculum, technology and transformation for an unknown future, 2010, pp. 852-863.
Sharma et al., Conceptual Captions: A Cleaned, Hypernymed, Image Alt-text Dataset for Automatic Image Captioning, Proceedings of the 56th Annual Meeting of the Association for Computational Linguistics, vol. 1, 2018, pp. 2556-2565.
Silberer et al., Learning Grounded Meaning Representations with Autoencoders, Proceedings of the 52nd Annual Meeting of the Association for Computational Linguistics, vol. 1, Jun. 2014, pp. 721-732.
Simonyan et al., Very Deep Convolutional Networks for Large-Scale Image Recognition, ICLR, Available online at: https://arxiv.org/abs/1409.1556, Apr. 10, 2015, 14 pages.

(56) References Cited

OTHER PUBLICATIONS

Srivastava, Multimodal Learning with Deep Boltzmann Machines, Advances in neural information processing systems, 2012, pp. 2222-2230.

Tan et al., Lxmert: Learning Cross-modality Encoder Representations from Transformers, arXiv:1908.07490, Available Online at: https://arxiv.org/pdf/1908.07490.pdf, 2019, 14 pages.

Vaswani et al., Attention is all You Need, 31st Conference on Neural Information Processing Systems, Available Online at: arXiv.1706.03762v5, Dec. 6, 2017, 15 pages.

Welbl et al., Constructing Datasets for Multi-hop Reading Comprehension Across Documents, Transactions of the Association for Computational Linguistics, vol. 6, 2018, pp. 287-302.

Yagcioglu et al., Recipeqa: A Challenge Dataset for Multimodal Comprehension of Cooking Recipes, Proceedings of the 2018 Conference on Empirical Methods in Natural Language Processing, Oct.-Nov. 2018, 11 pages.

Yang et al., Hotpotqa: A Dataset for Diverse, Explainable Multi-hop Question Answering, arXiv:1809.09600, Available Online at: https://arxiv.org/abs/1809.09600, 2018, 12 pages.

Zhu et al., MSMO: Multimodal Summarization with Multimodal Output, Proceedings of the 2018 conference on empirical methods in natural language processing, 2018, pp. 4154-4164.

Ren et al., Faster R-Cnn: Towards Real-Time Object Detection With Region Proposal Networks, In Advances in neural information processing systems, 2015, pp. 1-9.

Bajaj et al., Ms Marco: A Human Generated Machine Reading Comprehension Dataset, 30th Conference on Neural Information Processing Systems (NIPS 2016), Barcelona, Spain, 2016, arXiv preprint arXiv:1611.09268, 2018, pp. 1-11.

\* cited by examiner

| QUERY | ANSWER |
|---|---|
| What is the shape of a banana? | The banana is a tropical food with a long body covered in yellow skin. 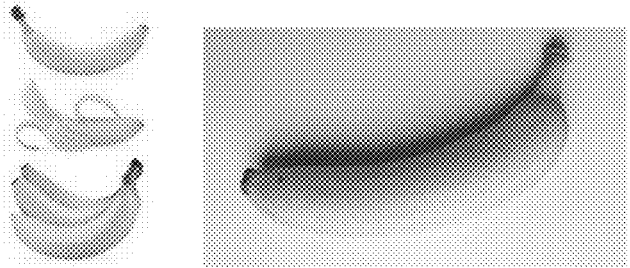 |
| Varieties of apple | Many varieties of apple are available in Australia, such as Red Delicious, Pink Lady, Granny Smith, Fuji, Golden Delicious. Apples have hundreds of color and flavor varieties. 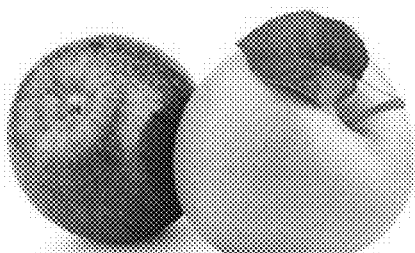 |
| History of Bali | Bali was inhabited around 2000 BCE by Austronesian people. These people migrated originally from the island of Taiwan to Southeast Asia and Oceania through Maritime Southeast Asia. |
| Vitamins present in apple | Apples contain vitamins A, C, K and folate. Vitamin A is important for growth and development and the maintenance of our immune system. Vitamin C is needed for the growth and repair of tissues in the body. Vitamin K is important for helping our blood to clot. Apple is very beneficial for our health because of the minerals it contains such as potassium (which helps to regulate blood pressure), manganese (involved in the regulation of brain and nerve function), magnesium (involved in the regulation of muscle, heart and nerve function and keeping bones strong) and boron (important for bone health). Another benefit of apple is that it contains dietary fibre, which is important for a healthy bowel. |

*FIG. 7*

MODALITY ADAPTIVE INFORMATION RETRIEVAL

TECHNICAL FIELD

This disclosure relates generally to computer-implemented methods and systems for natural language processing. Specifically, the present disclosure involves machine-learning techniques that use multiple types of content from source documents, such as text and images, for answering a text-based query.

BACKGROUND

Digital documents are becoming more and more prevalent and have become a huge source of knowledge accessible via various software tools, such as search engines, virtual assistant software, etc. These digital documents typically contain diverse, multimodal content, including text, images, charts, audio, and video. One type of content (referred to herein as "modality") in the digital documents, such as images, often contains useful information supplemental to the information contained in another modality of the documents, such as text. However, current technologies employ a unimodal understanding of the documents limiting the information provided in response to a knowledge query to only one modality, such as a text-only answer or an image-only answer. As such, the unimodal answer misses useful information contained in other modalities of the documents. While multiple unimodal models can be combined to provide a multimodal answer to a knowledge query, such a combination of multiple unimodal models lacks the understanding of the relationship between the multiple modalities of the documents. As a result, the generated combination of multiple unimodal answers may be inaccurate.

SUMMARY

Certain embodiments involve modality adaptive information retrieval from digital documents. In one example, a method for generating a modality-adaptive response to a query is described. The method includes a multimodal query subsystem receiving a text-based query and determining, in source documents, a text passage and a set of images that are relevant to the text-based query. The multimodal query subsystem further accesses a multimodal question-answering model that includes a textual stream of language models containing a set of transformer-based models concatenated with each other and a visual stream of language models containing another set of transformer-based models concatenated with each other. Each transformer-based model in the multimodal question-answering model includes a cross-attention layer using data generated by both the textual stream of language models and the visual stream of language models as input. The multimodal query subsystem generates an indication of a portion of the text passage that is relevant to the text-based query by, for example, applying the textual stream of language models to the text passage. The multimodal query subsystem further computes, with the visual stream of language models, relevance scores of the text-based query for the set of images, respectively. The relevance scores are computed based on data received from the textual stream of language models via cross-attention layers of the visual stream of language models. The multimodal query subsystem generates a response to the text-based query which includes the portion of the text passage, or an image in the set of images according to the respective relevance scores, or both.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 7 depicts examples of queries and respective modality-adaptive answers generated using the multimodal query-answer model, according to certain aspects of the present disclosure.

DETAILED DESCRIPTION

Figure 1:
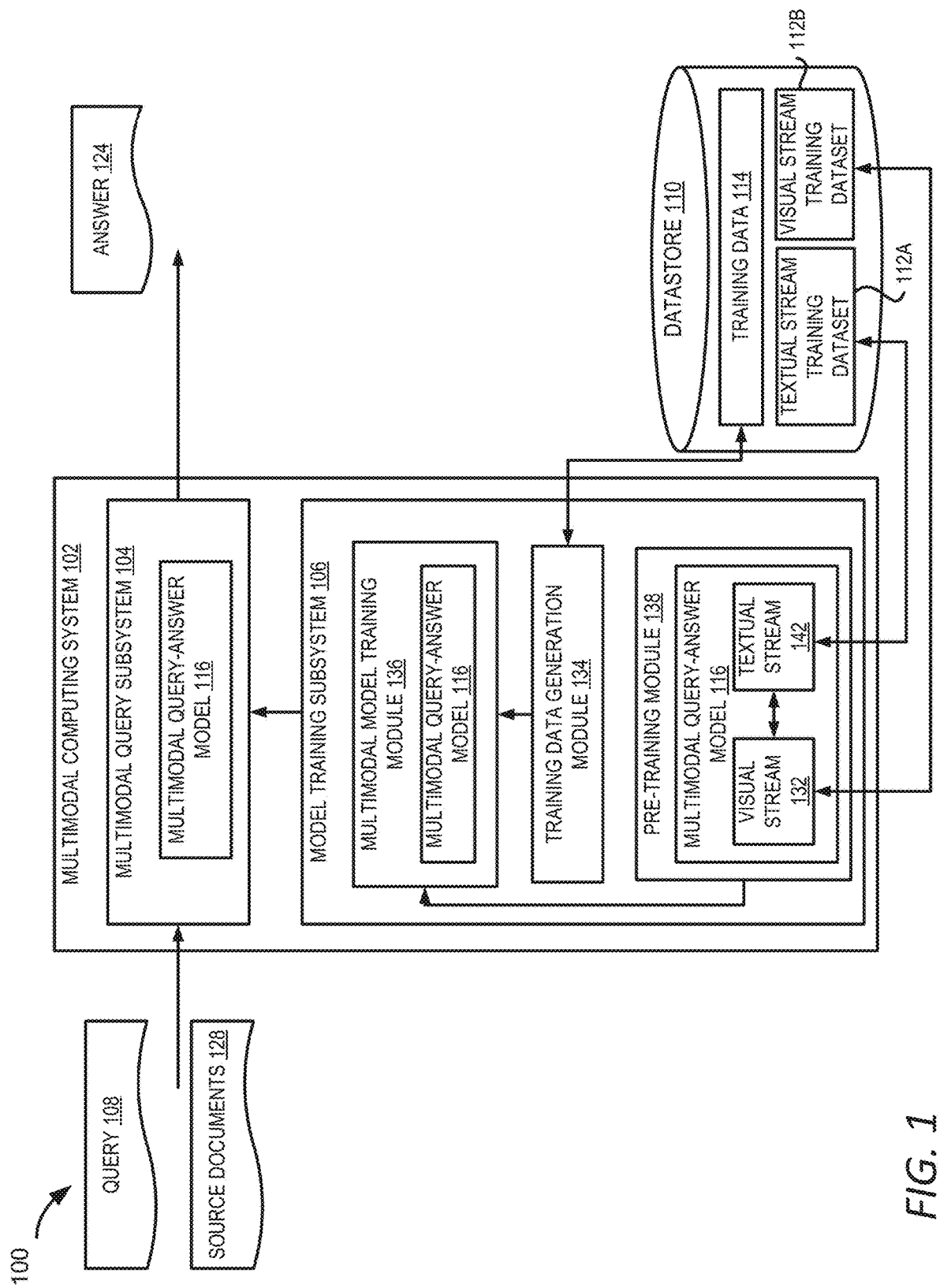
FIG. 1 depicts an example of a computing environment for generating and using a multimodal query-answer model to generate a modality-adaptive answer for a query from one or more source documents, according to certain aspects of the present disclosure.

The present disclosure involves modality-adaptive information retrieval from digital documents. A modality of a document refers to a type of content in the document, such as text, image, chart, audio, or video. As discussed above, existing information retrieval methods often generate unsatisfactory results because only a single modality of the documents, such as text, is considered when generating answers to a query. Certain embodiments described herein address these limitations by generating and training a multimodal query-answer model to generate answers to queries by taking into account multiple modalities of the source documents.

For instance, a model training subsystem generates and trains a multimodal query-answer model containing multiple streams of model blocks each processing one modality of the documents, such as a textual stream for text content in the documents and a visual stream for image content. Each stream is configured to predict the relevance of the content in the corresponding modality to a query. A model block in a stream interacts with another stream by including a cross-attention layer that accepts data from another stream as input (e.g., the visual stream takes the data generated by the textual stream as input to its cross-attention layer or vice versa). As a result, multiple modalities of the documents are evaluated in conjunction with one another to identify the relevant content for an input query. The answer to the query includes content from these multiple modalities that are relevant to the query.

The following non-limiting example is provided to introduce certain embodiments. In this example, a multimodal computing system receives a text-based query and determines relevant text passages and images from source documents where the answer to the query is to be extracted. To generate the answer, the multimodal computing system applies a multimodal query-answer model to the relevant text passages and images. The multimodal query-answer model includes a textual stream of transformer-based models concatenated one after another for processing the text passages. The multimodal query-answer model also includes a visual stream of transformer-based models concatenated one after another for processing the images. Each of the transformer-based models includes a cross-attention layer that uses data generated by both streams as input when processing the data in the respective stream. The textual stream of the multimodal query-answer model outputs the relevant portion in the text passages for answering the query, if there is any, and the visual stream of the multimodal query-answer model outputs the relevance of each image to the query. The multimodal computing system generates the answer to the query using the relevant portion in the text passages and one or more images according to their relevance to the query.

The multimodal computing system trains the multimodal query-answer model using training data for multimodal query-answer models. The multimodal computing system generates the training data by utilizing a dataset including queries and text-based answers for the respective queries. The multimodal computing system identifies, from the queries in the dataset, queries whose text-based answers are contained in documents including both textual and visual content. For each of these queries, the multimodal computing system extracts the images in the document that contains the answer to the query and calculates a relevance score of each image to the query. The relevance score is determined using information such as the image, the caption of the image, the text-based answer of the query, and the source passages containing the text-based answer in the documents. The multimodal computing system generates an entry of the training data for each query. The entry includes the query and the passages as input to the textual stream of the model, the text-based answer as the output of the textual stream, the images as input to the visual stream of the model, and the relevance scores of the images as the output of the visual stream. Using the generated training data, the multimodal computing system trains the multimodal query-answer model to obtain parameters of the multimodal query-answer model by optimizing a loss function.

As described herein, certain embodiments provide improvements to software tools that use machine-learning models for processing text. For instance, as noted above, existing technologies employ a limited, unimodal understanding of the documents and thereby restrict the information provided in response to a knowledge query to only one modality, such as a text-only answer or an image-only answer. Relying on these existing technologies could decrease the utility of software tools that use computer-based natural language processing to service queries (e.g., search engines, chat-based answer tools, virtual assistants).

Embodiments described herein can reduce or avoid issues presented by such a unimodal approach to query processing. For instance, these embodiments involve training and using a multimodal query-answer model that takes into account multiple modalities of source documents to obtain an answer to a query. When processing each of the multiple modalities of the documents (e.g., images), the multimodal query-answer model presented herein also uses data processed from another modality of the documents (e.g., text). As a result, the output of the multimodal query-answer model is more comprehensive and more accurate than existing technologies where only a single modality of the documents is processed to generate the answer. In addition, the process is modality adaptive in that the modalities contained in the answer are determined by the query and the documents themselves. Depending on the query and the information contained in the documents, an appropriate modality (image or text) or a combination of different modalities are automatically included in the answer to provide a comprehensive and accurate response. In this manner, the machine-learning techniques described herein improve the utility of software tools that rely on computer-based natural language processing.

Example Operating Environment for Modality Adaptive Information Retrieval

Referring now to the drawings, FIG. 1 depicts an example of a computing environment 100 for training and using a multimodal query-answer model 116 to generate a modality adaptive answer 124 (or "answer 124" in short) for a query 108. The computing environment 100 includes a multimodal computing system 102, which can include one or more processing devices that execute a multimodal query subsystem 104 and a model training subsystem 106. The multimodal query subsystem 104 employs a multimodal query-answer model 116 to generate the modality adaptive answer 124 for a query 108 from one or more source documents 128. The model training subsystem 106 prepares the multimodal query-answer model 116 by pre-training the multimodal query-answer model 116, generates training data 114 for the multimodal query-answer model 116, and trains the multimodal query-answer model 116 using the training data 114. In the example shown in FIG. 1, the multimodal query-answer model 116 includes two streams of model blocks: a visual stream 132 for processing images in the source documents 128 and a textual stream 142 for processing text in the source documents 128. The computing environment 100 further includes a datastore 110 for storing data used during the training, such as the training datasets 112A and 112B for pre-training the textual stream 142 and visual stream 132 of the multimodal query-answer model 116, respectively. The datastore 110 is also used to store the training data 114 generated for training the multimodal query-answer model 116.

The multimodal query subsystem 104 and the model training subsystem 106 may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, the multimodal query subsystem 104 and the model training subsystem 106 may be implemented in two different systems. In some implementations, the multimodal computing system 102 can be implemented using more or fewer systems or subsystems than those shown in FIG. 1, may combine two or more subsystems, or may have a different configuration or arrangement of the systems or subsystems.

The multimodal query subsystem 104 is configured to receive a query 108 requesting information that can answer the question posed in the query or otherwise related to the topic mentioned in the query. In some examples, the query is text-based and contains a question (e.g., "what is the shape of a banana?") or keywords or phrases (e.g., "varieties of apple"). The multimodal query subsystem 104 may further receive a selection of one or more source documents 128 from which an answer to the query 108 is extracted. In some examples, the source documents 128 are stored in a storage device that is accessible to the multimodal query subsystem 104. In other examples, the source documents 128 are transmitted to the multimodal query subsystem 104 along with or separately from the query 108.

To generate the answer 124 for the received query 108, the multimodal query subsystem 104 analyzes the identified source documents 128 for the query 108 to determine passages and images in the source documents 128 that are relevant to the query 108. The multimodal query subsystem 104 further applies the multimodal query-answer model 116 to the relevant passages and images to generate the answer 124. Additional details of analyzing the source documents 128 and generating the answer 124 are described below with respect to FIGS. 4 and 5.

In some implementations, the multimodal query-answer model 116 is trained using a model training subsystem 106. To increase the training efficiency, the visual stream 132 and the textual stream 142 are pre-trained. These two pre-trained streams of models are further trained together to obtain the multimodal query-answer model 116. In the example shown in FIG. 1, the model training subsystem 106 employs a pre-training module 138 to pre-train or initialize the visual stream 132 and the textual stream 142 of the multimodal query-answer model 116. To pre-train the visual stream 132 and the textual stream 142, the pre-training module 138 is further configured to generate visual stream training dataset 112B and textual stream training dataset 112A. The generated visual stream training dataset 112B and textual stream training dataset 112A are utilized to train the visual stream 132 and the textual stream 142, respectively.

Using the pre-trained visual stream 132 and textual stream 142, the model training subsystem 106 employs a multimodal model training module 136 to train the multimodal query-answer model 116 by training the visual stream 132 and textual stream 142 jointly. Since existing query-answer models are unimodal models, no existing training data are available for the multimodal query-answer model 116 proposed herein. As such, in some implementations, the model training subsystem 106 employs a training data generation module 134 to generate the training data 114 for the multimodal query-answer model 116. The generated training data 114 is then provided to the multimodal model training module 136 to train the multimodal query-answer model 116. Additional details regarding training the multimodal query-answer model 116 are provided below with respect to FIG. 3.

Figure 2:
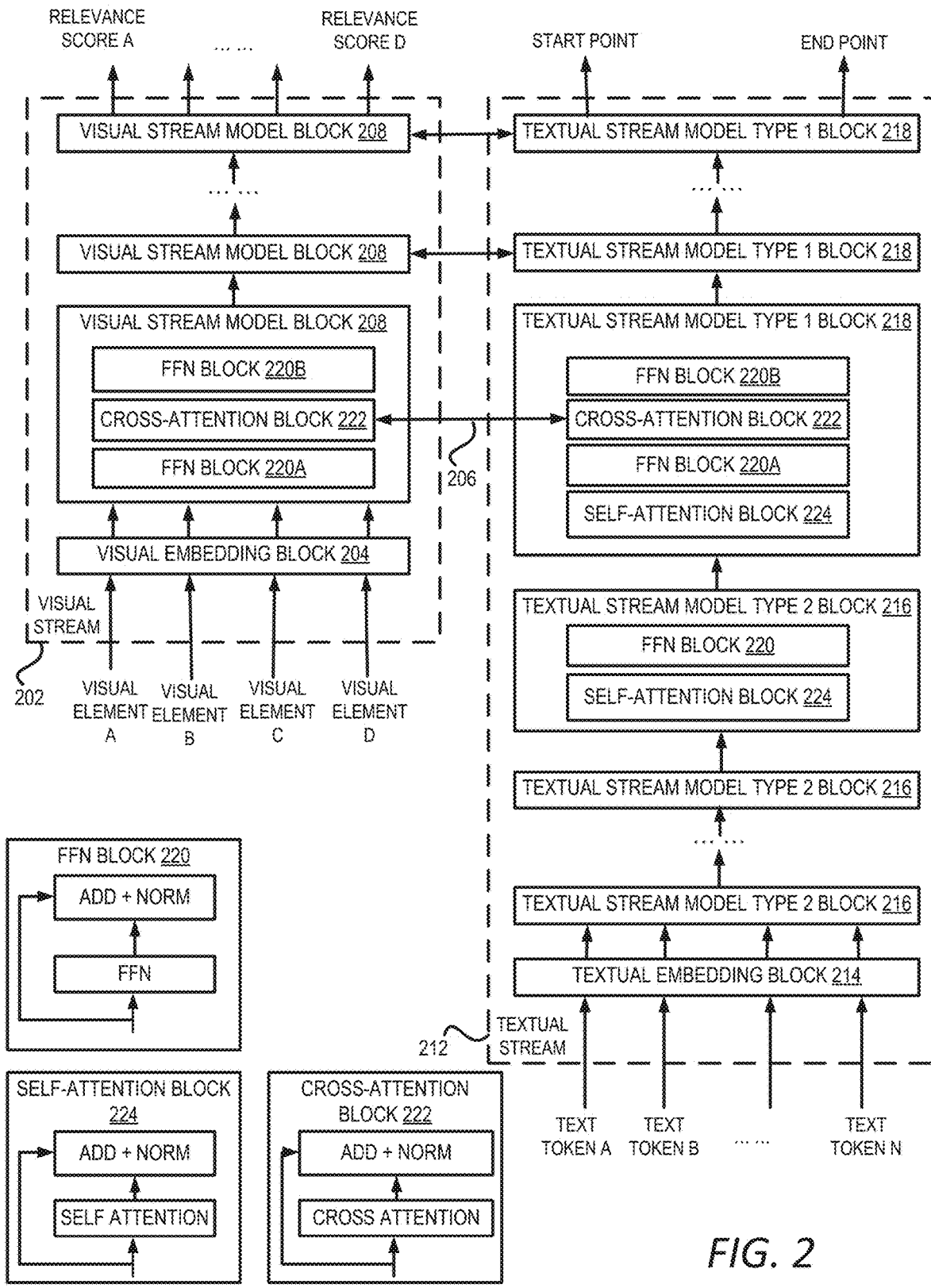
FIG. 2 depicts an example of a block diagram illustrating the components of a multimodal query-answer model, according to certain aspects of the present disclosure.

FIG. 2 depicts an example of a block diagram illustrating the components of a multimodal query-answer model 116, according to certain aspects of the present disclosure. The multimodal query-answer model 116 shown in FIG. 2 includes a visual stream 202 and a textual stream 212. In some examples, the visual stream 132 and the textual stream 142 shown in FIG. 1 are implemented using the visual stream 202 and the textual stream 212, respectively.

The textual stream 212 is configured to accept multiple text tokens as inputs, such as text tokens A-N. A token refers to a word in a text such as a sentence or a passage. The input text tokens to the textual stream 212 include text tokens from a query and passages from which the answer to the query is to be identified. In some implementations, the standard [CLS] and [SEP] tokens are utilized—the former prepended at the beginning and the latter embedded between the query and the input passage. In addition, positional embeddings and segment IDs are also included in the input to provide the positional information of tokens and to help distinguish between query and passage.

The output of the textual stream 212 contains the start point and the end point of a portion in the input passage that are relevant to the input query. As shown in FIG. 2, the textual stream 212 includes a set of textual stream language model blocks 218 concatenated with each other such that the output of a textual stream language model block 218 is provided as the input to the next textual stream language model block 218. In some examples, each of the language model blocks 218 in the textual stream 212 contains a transformer-based model.

In the example shown in FIG. 2, a textual stream language model block 218 includes one or more feedforward blocks 220A-B, a self-attention block 224, and a cross-attention block 222. FIG. 2 further shows an example for each of the feedforward blocks 220, the self-attention block 224, and the cross-attention block 222. In these examples, a feedforward block 220 contains a feedforward neural network and an addition and normalization layer connected as shown in FIG. 2. In some examples, the addition and normalization layer uses the standard LayerNorm component which scales the values of the input in a learnable fashion using their means and standard deviations. This helps to improve the stability of optimization. A self-attention block 224 contains a self-attention layer and an addition and normalization layer connected as shown in FIG. 2. In some examples, the self-attention layer takes as input the outputs of the previous layers where each text token attends to the other tokens in the input using the standard dot product attention methodology. This provides the model with the broader context for each token when it is present with other tokens. A cross-attention block 222 contains a cross-attention layer and an addition and normalization layer connected as shown in FIG. 2. Unlike the self-attention layer, the cross-attention layer uses outputs of the model blocks from both the textual stream 212 and the visual stream 202 as input.

The visual stream 202 is configured to accept multiple visual elements as inputs, such as visual elements A-D. A visual element can be an image, a video, or any type of visual content. For each of the input visual elements, the visual stream 202 is configured to output a relevance score indicating the relevance of the corresponding input visual element to the input query. As shown in FIG. 2, the visual stream 202 includes a set of visual stream language model blocks 208 concatenated with each other such that the output of a visual stream language model block 208 is provided as the input to the next visual stream language model block 208. In some examples, each of the language model blocks 208 in the visual stream 202 contains a transformer-based model and has a corresponding textual stream language model block 218 in the textual stream 212.

In the example shown in FIG. 2, a visual stream language model block 208 includes one or more feedforward blocks 220A-B and a cross-attention block 222. The input to the cross-attention block 222 of a visual stream language model block 208 in the visual stream 202 includes the output of the feedforward block 220A in the visual stream language model block 208 and the output of the feedforward block 220A of its corresponding textual stream language model block 218. Likewise, the input to the cross-attention block 222 of a textual stream language model block 218 in the textual stream 212 includes the output of the feedforward block 220A in the textual stream language model block 218 and the output of the feedforward block 220A of its corresponding visual stream language model block 208. This relationship between the cross-attention blocks in the corresponding visual stream language model block 208 and the textual stream language model block 218 is denoted as the cross-attention connection 206 in FIG. 2. In this way, each of the visual stream 202 and the textual stream 212 takes into account the information from the other stream when generating the output for the query.

Note that the visual stream language model block 208 is configured to remove the self-attention layer in a traditional transformer-based language model in order to reduce the interference between the different input visual elements. In the traditional transformer-based language model, the self-attention layer is introduced to relate different portions of a single sequence in order to compute a representation of the sequence. As such, the self-attention layer is used in models for sentences that consist of a sequence of words or a single image consisting of different regions. In the present disclosure, the input visual elements are separate individual visual elements, such as individual images, and do not belong to a sequence. The images mostly derive their relevance and context from the textual counterparts (powered by the cross-attention block) in the input passage or query unlike textual tokens which derive their contextual meaning from other tokens in the sentence. As a result, the self-attention layer in the traditional transformer-based language model could cause interferences among the separate, and often independent, input visual elements. To reduce the interferences, the visual stream language model block 208 removes the self-attention layer in the traditional transformer-based language model and instead includes a cross-attention layer to relate the visual stream with the textual stream.

In the example shown in FIG. 2, the textual stream 212 also includes a set of type 2 textual stream language model blocks 216. Each of type 2 textual stream language model blocks 216 includes a feedforward block 220 and a self-attention block 224. This set of type 2 textual stream language model blocks 216 is similar to the traditional transformer-based language model, such as the bidirectional encoder representations from transformers (BERT) model. This set of type 2 textual stream language model blocks 216 are used to process and understand the textual input before processing the textual information in conjunction with the visual input.

The multimodal query-answer model 116 further includes an embedding layer for each of the visual stream 202 and textual stream 212, namely, the visual embedding block 204 and the textual embedding block 214 to transform the respective inputs to an embedding or a representation. In some examples, the visual embedding block 204 is configured to convert each of the input visual elements to a vector-based representation of the visual element representing the features of the visual element, such as the VGG-19 feature representations. Similarly, the textual embedding block 214 is configured to convert each of the input textual tokens to a vector-based representation of the textual token. These vector-based representations are understood by the language model blocks in the respective streams and thereby allowing the input information to be processed as described above.

Note that the various components of the multimodal query-answer model 116 shown in FIG. 2 is for illustration purposes only and should not be construed as limiting. More or fewer components may be included in the multimodal query-answer model 116. For example, a final block may be added to the visual stream 202 to generate the relevance score for each input visual element. Similarly, a final block can also be added to the textual stream 212 to generate the predicted start and end points of the relevant portion of the input passage. Furthermore, more than two streams of models can be included in the multimodal query-answer model 116 to represent multiple different modalities of the source documents, such as a stream of model blocks for text content, a stream of model blocks for image content, and a stream of model blocks for audio content. Each of these streams of model blocks includes a cross-attention layer interacting with the cross-attention layers in other streams in a way similar to that described above.

In an example implementation, the visual stream 202 is applied on images of the source documents 128, and the textual stream 212 is applied on the query 108 and the text passages in the source documents 128. The textual stream 212 includes $N_{Ta}$ type 2 textual stream language model blocks 216 and $N_{Tb}$ textual stream language model blocks 218. If the attention computation is represented in the query-key-value format, the cross-attention block 222 works by using the textual token as a query and the representations of the images from the visual stream 202 as the keys and values. This is different from the self-attention block where (query, keys, and values) are all input textual tokens of the textual stream 212.

Denote the representations of $i^{th}$ textual token and representations of $j^{th}$ image being used as input for $k^{th}$ layer in textual stream 212 and $(k-N_{T_a})^{th}$ layer in the visual stream 202 as $T_{k-1}^{i}$ and $V_{k-1}^{j}$, respectively. The attention with q query, k keys, and v values is given by attn(q, k, v) then the self-attention $T_{k_{self}}^{i}$ and cross-attention $T_{k_{cross}}^{i}$ for the textual stream is given by, $$T_{k_{self}}^{i} = \text{attn}(T_{k-1}^{i}, T_{k-1}, T_{k-1}) \quad (1)$$

$$T_{k_{cross}}^{i} = \text{attn}(T_{k_{self}}^{i}, V_{k-1}, V_{k-1}) \quad (2)$$

where $T_k: \{T_k^0, \ldots, T_k^n\}$ and $V_k: \{V_k^0, \ldots V_k^m\}$. Here, n is the number of textual tokens and m is the number of input images. The textual stream 212 further includes a final layer to calculate the start and end position of the relevant portion in the input passages. The setup of the final layer is similar to the original BERT model where one linear layer predicts the starting token through softmax applied over all tokens while another layer predicts the ending token in a similar manner. The goal is to optimize the cross-entropy loss over both the token position predictions.

The visual stream in this example has $N_v = N_{T_b}$ visual stream language model blocks 208. As discussed above, there is only one type of layer in each visual stream language model block 208 and all the layers consist of only cross-attention blocks 222 (along with feedforward layers and residual connections) and do not contain self-attention block 224. The cross-attention block is similar to the textual stream except that query is an image feature vector representation, and the keys and values are feature representations of textual tokens in the corresponding layer of the textual stream 212. In this example, the input to the visual stream is the VGG-19 features of each of the images. The positional and segment encodings are not used in the visual stream 202 to avoid providing any positional information to the multimodal query-answer model 116. Further, a linear head on top of visual features is used to predict whether a particular image should be part of the multimodal output answer. The image with the highest relevance score to the query is regarded as the predicted image.

Figure 3:
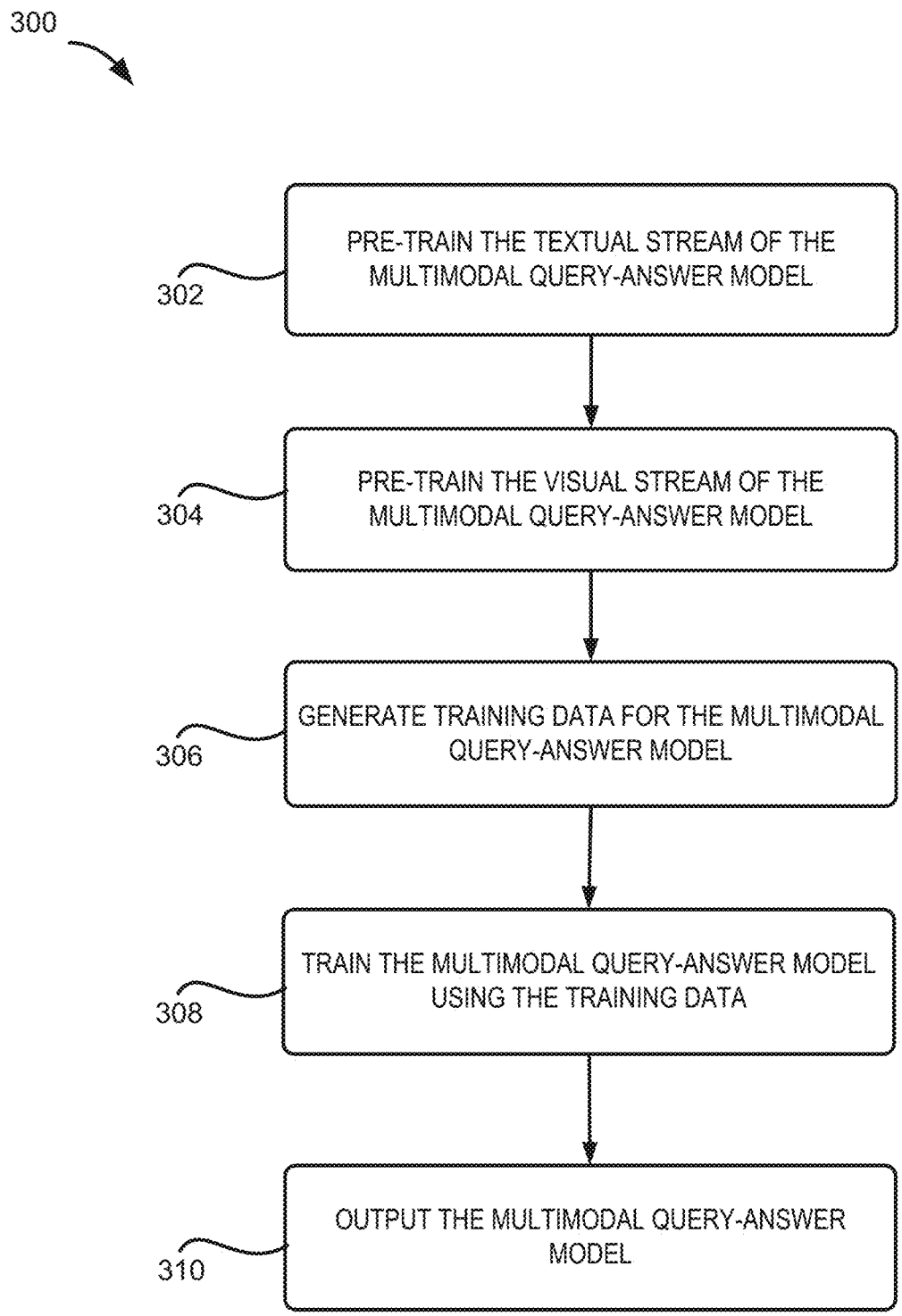
FIG. 3 depicts an example of a process for generating and training a multimodal query-answer model, according to certain aspects of the present disclosure.

Examples of Computer-Implemented Operations for Modality Adaptive Information Retrieval FIG. 3 depicts an example of a process 300 for generating and training a multimodal query-answer model 116, according to certain aspects of the present disclosure. One or more computing devices (e.g., the multimodal computing system 102) implement operations depicted in FIG. 3 by executing suitable program code (e.g., the model training subsystem 106). For illustrative purposes, the process 300 is described with reference to certain examples depicted in the figures. Other implementations, however, are possible.

At block 302, the process 300 involves pre-training the textual stream 212 of the multimodal query-answer model 116. Pre-training individual streams in the multimodal query-answer model 116 is used herein to better initialize the model so that fewer iterations are required when training the multimodal query-answer model 116. This leads to reduced computational complexity in the training process of the multimodal query-answer model 116. In some examples, pre-training the textual stream 212 is performed using a textual stream training dataset 112A that includes (query, answer) tuples. The training dataset can be generated, for example, from queries and answers generated by search engines across webpages.

Alternatively or additionally, the standard Masked Language Modelling (MLM) task over a dataset containing weakly-associated descriptive captions of images is used to pre-train the textual stream 212. The model training subsystem 106 further employs the cross-entropy loss over the masked tokens for the training. While the task is intended to train the textual stream 212, since the entire caption is retrieved from the visual information also, the visual stream is also fine-tuned in this process. Since the final multimodal query-answer model 116 uses segment IDs as input, a segment ID of either query or passage is randomly assigned to each caption during training runtime in order to ingest language understanding for both types of tokens.

At block 304, the process 300 involves pre-training the visual stream 202 of the multimodal query-answer model 116. To pre-train the visual stream 202, the model training subsystem 106, or more specifically the pre-training module 138 of the model training subsystem 106, generates the visual stream training dataset 112B. The generation can be performed by modifying an existing dataset containing images and their associated captions. For example, the image dataset is modified by choosing a random number between 3 to 10 (N) for each caption followed by selecting N−1 negative images or irrelevant images (i.e. those images which have different captions) along with the image that is associated with the caption. As a result, for each caption we have one image that is associated with the caption according to the original dataset and N−1 negative images.

During the pre-training, the caption is provided as input to the textual stream 212 and the N images are provided as input to the visual stream 202. The multimodal query-answer model 116 is trained to predict the image corresponding to the caption by using binary cross-entropy loss over images. Again, while this task focuses majorly on visual stream initialization or pre-training, the textual stream is also fine-tuned due to the cross-attention layers between the two streams.

At block 306, the process 300 involves generating training data for the multimodal query-answer model 116. As discussed above, since multimodal output for question and answering is a new problem, there are no existing datasets suitable to train the multimodal query-answer model 116. Therefore, the model training subsystem 106 is configured to generate the training data 114 for the multimodal query-answer model 116 by utilizing existing datasets. For example, question and answering datasets often contain answers that come from an article, such as a Wikipedia article. Since articles often contain related images, such images can thus be used as the input visual elements in the multimodal query-answer model 116.

As such, to construct the training data 114, the model training subsystem 106 identifies the original articles containing the answers to queries in a given question-answer dataset. The model training subsystem 106 further filters the dataset by removing queries and answers whose original articles contain no images. In some examples, the model training subsystem 106 further filters the dataset by removing queries and answers with a single-word answer. For the remaining queries and answers, the model training subsystem 106 extracts the images from the original articles.

The training data 114 requires information as to how each image in the training data (i.e., the extracted images) is relevant to the corresponding query so that supervision is provided to the training process. To achieve this goal, the model training subsystem 106 develops the relevance scores of the extracted images by utilizing two types of information about the image—the position of the image in the original input article and the caption information of the image. Note that the caption and position information is used only to obtain the target scores during training and not as an explicit input to the multimodal query-answer model 116. Thus the multimodal query-answer model 116 is able to infer the correct multimodal response irrespective of the availability of such information at inference time when generating the answers to queries.

To calculate the relevance scores of the extracted training images in some examples, the model training subsystem 106 calculates a set of scores for a training image. One score is the proximity score which is determined by calculating the proximity distance P between the first token of source passage of the answer and the training image using the number of tokens as the distance unit. The source passage of an answer is the passage containing the answer in the source article. The model training subsystem 106 further normalizes the number of tokens with the total number of tokens present in the entire article. In addition, the model training subsystem 106 calculates three term frequency-inverse document frequency (TF-IDF) scores for the caption of the training image: a TF-IDF score of the caption with the query, a TF-IDF score of the caption with the answer, and a TF-IDF score of the caption with the source passage. The overall relevance score of the image is then calculated as a weighted sum of these four scores with the proximity score being calculated as 1-P.

Figure 4:
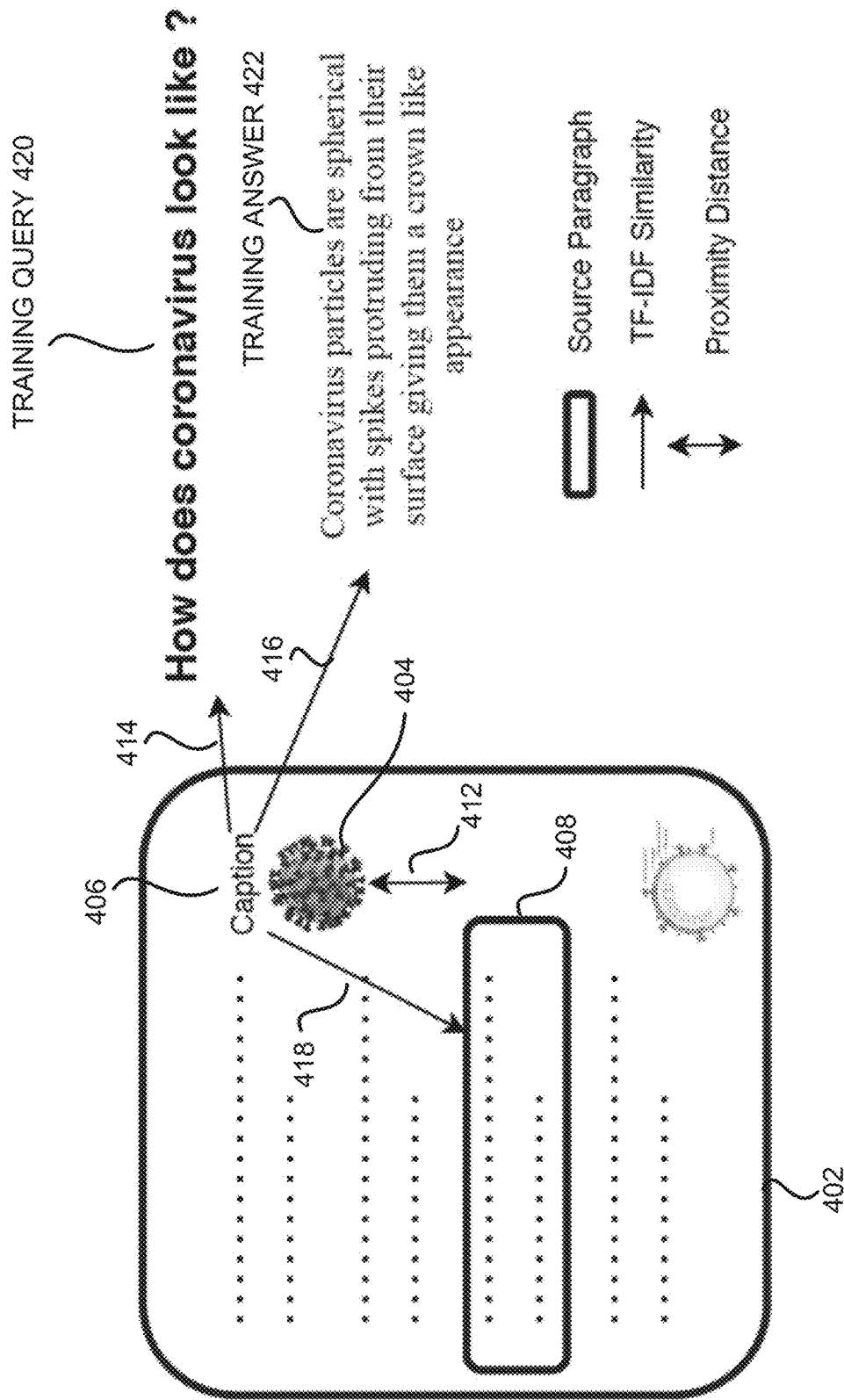
FIG. 4 depicts an example of a set of scores calculated to determine a relevance score of a training image to a training query, according to certain aspects of the present disclosure.

FIG. 4 shows an example of the set of scores calculated to determine a relevance score of a training image to a training query. In this example, the training query 420 is "how does coronavirus look like?" and the training answer 422 is "Coronavirus particles are spherical with spikes protruding from their surface giving them a crown like appearance." The source article 402 and the source passage 408 are known. From the source article 402, the model training subsystem 106 extracts an image 404. To calculate the relevance score of the image 404, the model training subsystem 106 calculates a proximity score as 1-P and P is the proximity distance 412 between the caption 406 of the image 404 and the source passage 408. In this example, this proximity distance 412 is measured as the number of tokens between the image 404 and the first token of source passage 408. The number of tokens is further normalized by dividing it by the total number of tokens in the source article. The model training subsystem 106 further calculates the three TF-IDF scores: the TF-IDF score 414 of the caption 406 with the training query 420, the TF-IDF score 416 of the caption 406 with the training answer 422, and the TF-IDF score 418 of the caption 406 with the source passage 408. These four scores are then combined through a weighted summation. Once the combined scores are obtained, the model training subsystem 106 uses these normalized (between 0 and 1) scores as the relevance score for the output layer of the visual stream 202.

The above process is repeated for every image extracted from a source article of a query. As a result, each entry in the training data 114 includes a query, a source passage, a text-based answer with the start and end points of the answer in the source passage, one or more images, and the corresponding relevance scores of these images.

Referring back to FIG. 3, at block 308 the process 300 involves training the multimodal query-answer model 116 using the generated training data 114. During the training, the query and the source passage in the training data 114 are input to the textual stream 212 of the multimodal query-answer model 116, and the start and end points of the answer of the query are used at the training output to supervise the training of the textual stream 212. The images are provided to the visual stream 202 as input and their respective relevance scores are used as training outputs to supervise the training of the visual stream 202.

Different loss functions are used for the two streams of the multimodal query-answer model 116. In some examples, the regular cross-entropy is used for textual stream 212. The weighted binary cross-entropy loss (for each input image separately) is used for the visual stream 202 and is formulated as follows:

$$l = -w_i * \log(f_i) - (1-w_i) * \log(1-f_i) \quad (3)$$

Here, $w_i$ is the relevance score calculated for the $i^{th}$ training image and f is the predicted score for the $i^{th}$ image by the visual stream 202. The weighted binary cross-entropy losses for different images are then averaged to determine the loss for the textual stream 212. The loss function of the multimodal query-answer model 116 is calculated by summing or otherwise combining the losses for the visual stream 202 and the textual stream 212. The model training subsystem 106 trains the multimodal query-answer model 116 by iteratively adjusting the parameters of the multimodal query-answer model 116 (including the visual stream 202 and the textual stream 212) to minimize the loss function. At block 308, the model training subsystem 106 outputs the trained multimodal query-answer model 116.

Figure 5:
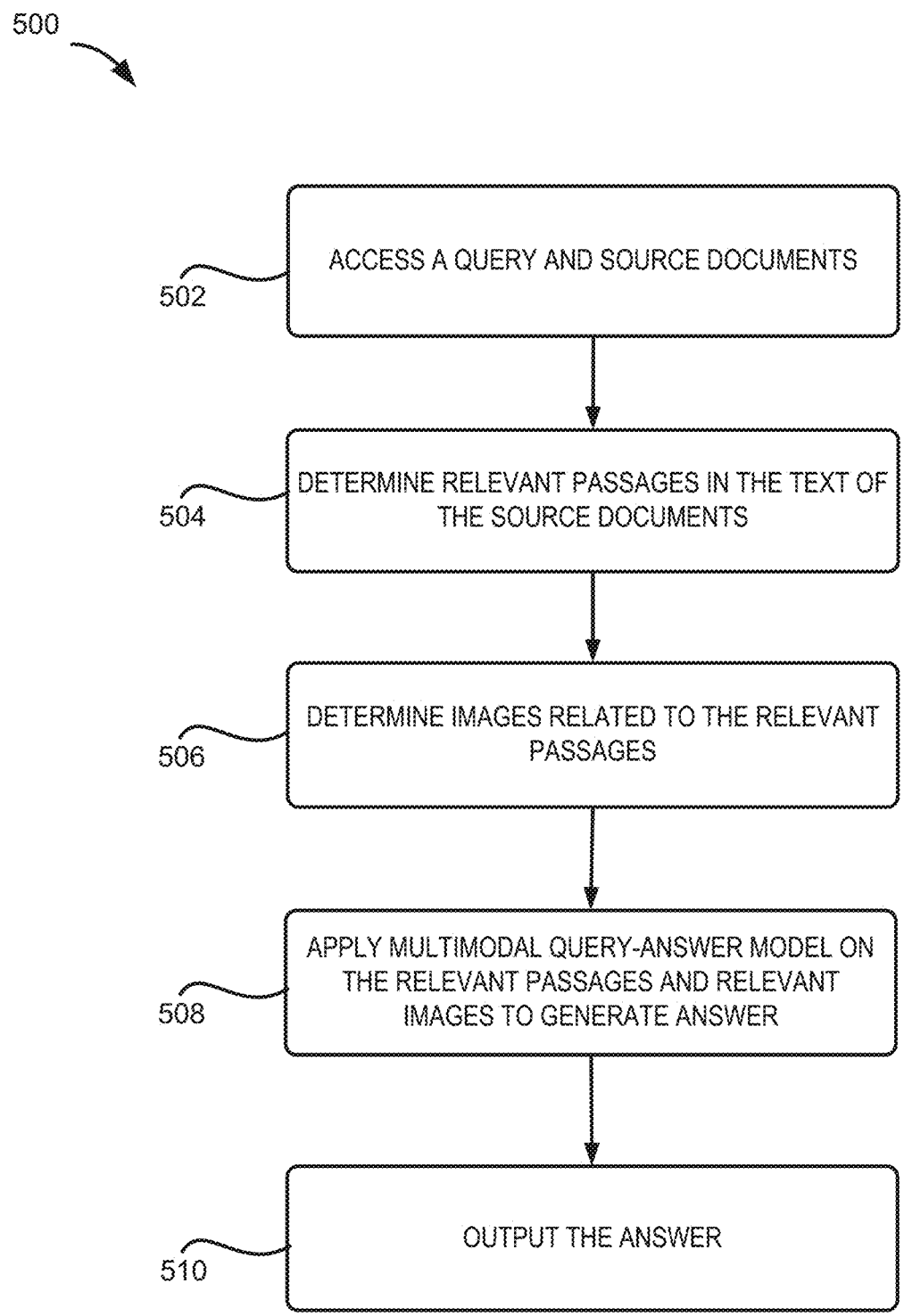
FIG. 5 depicts an example of a process for using a multimodal query-answer model to generate a modality-adaptive answer for a query, according to certain aspects of the present disclosure.

FIG. 5 depicts an example of a process 500 for using a multimodal query-answer model 116 to generate a modality-adaptive answer 124 for a query 108, according to certain aspects of the present disclosure. FIG. 5 will be described in conjunction with FIG. 6 which depicts an example of a block diagram illustrating modules and models used for generating a modality-adaptive answer for a query using the multimodal query-answer model. One or more computing devices (e.g., the multimodal computing system 102) implement operations depicted in FIG. 5 by executing suitable program code (e.g., the multimodal query subsystem 104). For illustrative purposes, the process 500 is described with reference to certain examples depicted in the figures. Other implementations, however, are possible.

At block 502, the process 500 involves accessing a query 108 and one or more source documents. For example, the query 108 is received by the multimodal query subsystem 104 from a user through a user interface configured to receive query requests. The one or more source documents may be specified by the user when submitting the query, for example, using the same user interface, or selected from a set of default source documents according to the type of query 108.

Figure 6:
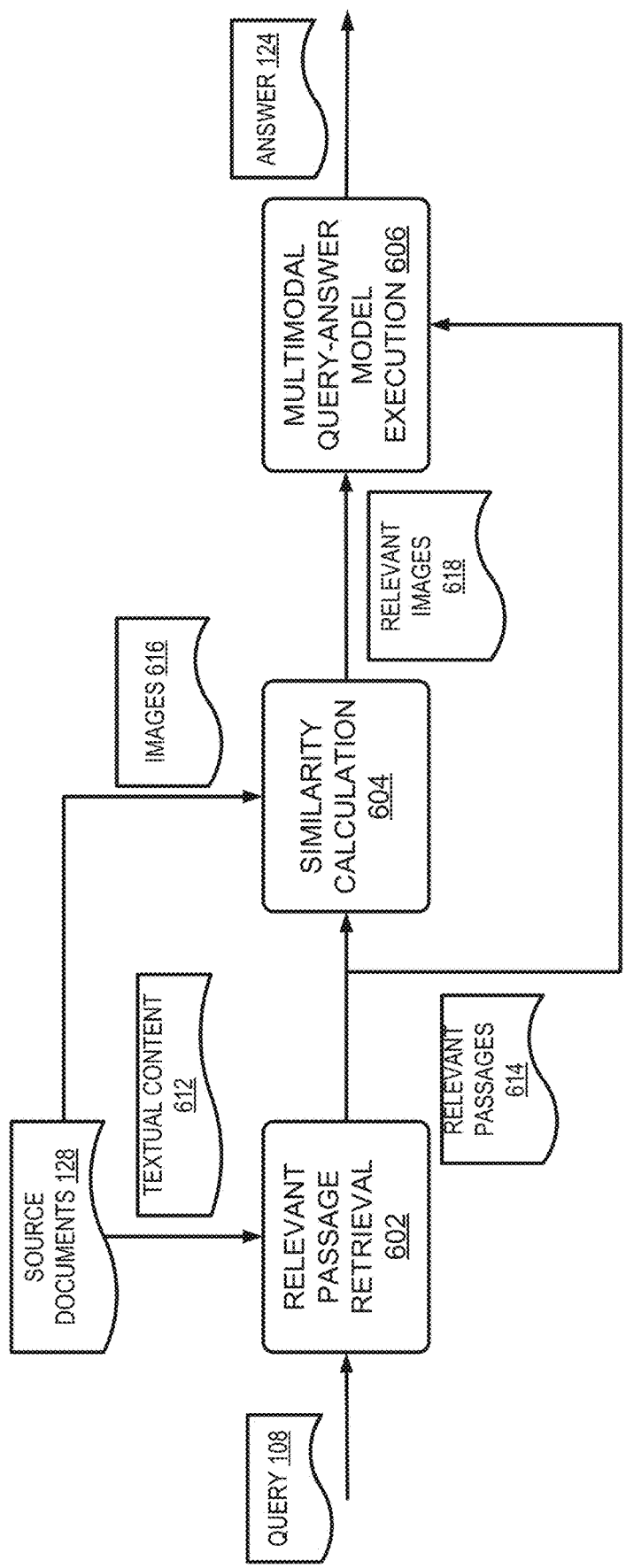
FIG. 6 depicts an example of a block diagram illustrating modules and models used for generating a modality-adaptive answer for a query using the multimodal query-answer model, according to certain aspects of the present disclosure.

At block 504, the process 500 involves the multimodal query subsystem 104 determining the relevant passages in the text content of the source documents. In some examples, the relevant passages are determined using a language model configured to rank passages in documents according to a query and retrieve text passages from the documents that are relevant to the query. As shown in FIG. 6, the relevant passage retrieval 602 uses the textual content 612 of the source documents 128 to generate the relevant passages 614. In some implementations, a BERT language model is used for the relevance passage retrieval 602 to identify the relevant passages 614.

At block 506, the process 500 involves the multimodal query subsystem 104 identifying images in the source documents are that related to the relevant passages. In the example shown in FIG. 6, the relevant images are identified by calculating the similarity between each image 616 in the source documents 128 and the relevant passages 614. To perform the similarity calculation 604, the multimodal query subsystem 104 converts each of the images 616 in the source documents 128 and the relevant passage 614 into an embedding representation, such as universal image-text representation (UNITER)-based embedding. These embedding representations transform the images and passages into a common space so that they can be compared with each other to determine the similarities. In some examples, the similarity between an image and a relevant passage is calculated as a distance between the embedding representations of the image and the relevant passage, such as a cosine distance. Those images whose similarities with at least one of the relevant passages 614 are higher than a threshold value are determined as relevant images 618 for the query 108.

At block 508, the process 500 involves applying the multimodal query-answer model 116 on the relevant passages 614 and the relevant images 618. For example, the query 108 and the relevant passages are provided to the textual stream 212 of the multimodal query-answer model 116 and the relevant images 618 are input to the visual stream 202 of the multimodal query-answer model 116. The multimodal query-answer model execution 606, therefore, outputs the start and end points of the relevant portion in the relevant passages 614 through the textual stream 212. Using the start- and end-point indicator, the multimodal query subsystem 104 extracts the text from the relevant passages 614 that answers the query 108. However, if the model decides that there is no text in the relevant passages 614 to answer the query, no start and end points are output from the textual stream 212 and no text is extracted.

Further, the visual stream 202 of the multimodal query-answer model 116 outputs a relevance score for each of the relevant images 618. In some examples, the multimodal query subsystem 104 compares these relevance scores with a threshold score. Those images having relevance scores higher than the threshold score are determined to be relevant to the query 108. The multimodal query subsystem 104 further generates the answer 124 to the query 108 by including the images relevant to the query 108, if there is any, and the extracted text, if there is any. Thus, depending on the output of the multimodal query-answer model 116, the answer 124 to a query 108 may include only text, only image, or both text and images. At block 510, the multimodal query subsystem 104 outputs the answer 124.

FIG. 7 depicts examples of queries and respective modality adaptive answers generated using the multimodal query-answer model, according to certain aspects of the present disclosure. In the examples shown in FIG. 7, some queries have both text and image in their answers, and others have only text-based answers. This is due to the modality adaptive nature of the multimodal query-answer model 116 which is configured to output the modality or modalities that are relevant to the query. In addition, the text and images contained in the answers shown in FIG. 7 may be extracted from one source document or multiple source documents. This is determined by the query and the content of the source documents.

Although the above description focuses on English query-answer application, the modality adaptive knowledge retrieval presented herein applies to any language as long as the training datasets are in the proper language. Further, while text and image are used as the modalities in the above example, the technologies presented herein apply to any other types of modalities.

Computing System Example for Implementing Modality Adaptive Knowledge Retrieval

Figure 8:
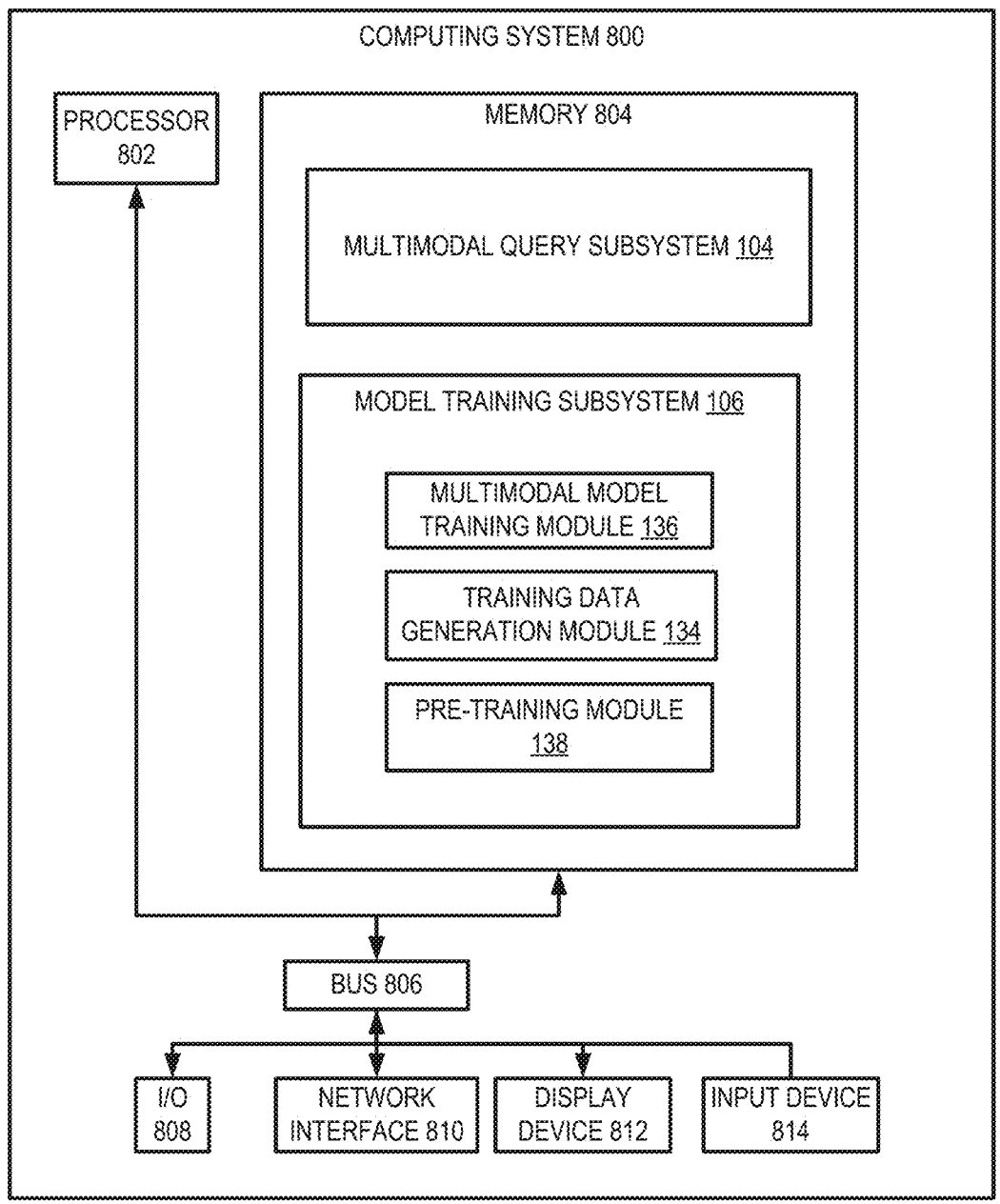
FIG. 8 depicts an example of a computing system that can be used to implement certain aspects of the present disclosure.

Any suitable computing system or group of computing systems can be used for performing the operations described herein. For example, FIG. 8 depicts an example of a computing system 800 that can implement the computing environment of FIG. 1. In some embodiments, the computing system 800 includes a processing device 802 that executes the multimodal query subsystem 104, the model training subsystem 106, or a combination of both, a memory that stores various data computed or used by the multimodal query subsystem 104 or the model training subsystem 106, an input device 814 (e.g., a mouse, a stylus, a touchpad, a touchscreen), and a display device 812 that displays content generated by the multimodal query subsystem 104. For illustrative purposes, FIG. 8 depicts a single computing system on which the multimodal query subsystem 104 or the model training subsystem 106 is executed, and the input device 814 and display device 812 are present. But these applications, datasets, and devices can be stored or included across different computing systems having devices similar to the devices depicted in FIG. 8.

The depicted example of a computing system 800 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory, computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as an input device 814, a display device 812, or other input or output devices. For example, the computing system 800 is shown with one or more input/output ("I/O") interfaces 808. An I/O interface 808 can receive input from input devices or provide output to output devices. One or more buses 806 are also included in the computing system 800. The buses 806 communicatively couples one or more components of a respective one of the computing system 800.

The computing system 800 executes program code that configures the processing device 802 to perform one or more of the operations described herein. The program code includes, for example, the multimodal query subsystem 104, the model training subsystem 106 or other suitable applications that perform one or more operations described herein. The program code may be resident in the memory device 804 or any suitable computer-readable medium and may be executed by the processing device 802 or any other suitable processor. In some embodiments, all modules in the model training subsystem 106 (e.g., the multimodal model training module 136, the training data generation module 134, the pre-training module 138) are stored in the memory device 804, as depicted in FIG. 8. In additional or alternative embodiments, one or more of these modules from the model training subsystem 106 are stored in different memory devices of different computing systems.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device that receives inputs for the multimodal query subsystem 104 or displays outputs of the multimodal query subsystem 104) via a data network using the network interface device 810.

An input device 814 can include any device or group of devices suitable for receiving visual, auditory, or other suitable input that controls or affects the operations of the processing device 802. Non-limiting examples of the input device 814 include a touchscreen, stylus, a mouse, a keyboard, a microphone, a separate mobile computing device, etc. A display device 812 can include any device or group of devices suitable for providing visual, auditory, or other suitable sensory output. Non-limiting examples of the display device 812 include a touchscreen, a monitor, a separate mobile computing device, etc.

Although FIG. 8 depicts the input device 814 and the display device 818 as being local to the computing device that executes the multimodal query subsystem 104, other implementations are possible. For instance, in some embodiments, one or more of the input device 814 and the display device 812 can include a remote client-computing device that communicates with the computing system 800 via the network interface device 810 using one or more data networks described herein.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other types of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method, comprising:
   receiving and storing in a memory device, by a multimodal query subsystem, a text-based query;
   converting a set of images into a first embedding representation and one or more source documents into a second embedding representation;
   determining, based on a comparison of the first embedding representation and the second embedding representation, by the multimodal query subsystem in one or more source documents, a text passage and one or more images from the set of images that are relevant to the text-based query;
   accessing, by the multimodal query subsystem, a multimodal question-answering model comprising (a) a first stream of language models comprising a first set of transformer-based models concatenated with each other and (b) a second stream of language models comprising a second set of transformer-based models concatenated with each other, wherein each transformer- based model comprises a respective cross-attention layer using data generated by both the first stream of language models and the second stream of language models as input;
   generating, by the multimodal query subsystem, an indication of a portion of the text passage that is relevant to the text-based query by, at least, applying the first stream of language models to the text passage;
   computing and storing in the memory device, by the multimodal query subsystem and with the second stream of language models, relevance scores of the text-based query for the one or more images, respectively, wherein the relevance scores are computed based on data received from the first stream of language models via cross-attention layers of the second stream of language models;
   generating, by the multimodal query subsystem, a response to the text-based query comprising at least one of (a) the portion of the text passage or (b) an image among the one or more images from the set of images according to the respective relevance scores; and
   transmitting the response for display on a display device.

2. The computer-implemented method of claim 1, wherein determining the text passage and the one or more images that are relevant to the text- based query comprises:
   determining the text passage from a text portion of the one or more source documents;
   extracting multiple images from the one or more source documents;
   determining a similarity between each of the multiple images and the text passage; and
   identifying the one or more of images that are relevant to the text-based query as images among the multiple images having a similarity higher than a pre- determined threshold.

3. The computer-implemented method of claim 1, wherein each of the first set of transformer-based models in the first stream of language models further comprises a self-attention layer using data generated by the first stream of language models as an input.

4. The computer-implemented method of claim 3, wherein each of the first set of transformer-based models in the first stream of language models and the second set of transformer-based models in the second stream of language models further comprises a feedforward neural network.

5. A computer-implemented method for generating a multimodal question-answering model for providing a multimodal answer to a query, the method comprising:
- a training data generation module configured for generating and storing in a memory device training data for the multimodal question-answering model, wherein the multimodal question-answering model comprises a first stream of language models configured for text content and a second stream of language models configured for image content, generating the training data comprising:
  - accessing a dataset comprising queries and text-based answers for the respective queries;
  - identifying, from the queries in the dataset, a query whose text-based answer is contained in a document including both textual content and image content;
  - converting the image content from the document into an embedding representation;
  - extracting the image content from the embedding representation;
  - determining a relevance score indicating a relevance of the image content to the query using one or more embedding representations of the image content, a caption of the image content, the text-based answer of the query, or a source passage containing the text-based answer in the document; and
  - generating an entry of the training data that includes the query, the source passage, the image content, the text-based answer, and the relevance score of the image content; and
- a model training module configured for training the multimodal question-answering model using the training data.

6. The computer-implemented method of claim 5, wherein determining the relevance score comprises:
- calculating a proximity distance between the image content and the source passage using a number of tokens as a distance unit;
- calculating a first term frequency-inverse document frequency (TF-IDF) score of the caption of the image content with the query;
- calculating a second TF-IDF score of the caption of the image content with the text-based answer;
- calculating a third TF-IDF score of the caption of the image content with the source passage; and
- computing the relevance score of the image content by combining the proximity distance, the first TF-IDF score of the caption, the second TF-IDF score of the caption, and the third TF-IDF score of the caption.

7. The computer-implemented method of claim 6, wherein a loss function used in training the multimodal question-answering model comprises a loss term for the image content, the loss term for the image content comprising a weighted binary cross-entropy with a weight as the relevance score.

8. The computer-implemented method of claim 5, wherein:
- the first stream of language models is configured to accept a query and a text passage as input and output an indication of a portion of the text passage that is relevant to the query; and
- the second stream of language models is configured to accept multiple images as input and output a relevance score to the query for each of the multiple images.

9. The computer-implemented method of claim 5, wherein the second stream of language models comprising a plurality of transformer-based models concatenated with each other, each of the plurality of transformer-based models comprising a cross-attention layer that uses data generated by both the first stream of language models and the second stream of language models as an input.

10. The computer-implemented method of claim 5, further comprising a pre- training module configured for:
- pre-training the first stream of language models using a first training dataset comprising queries and corresponding text-based answers; and
- pre-training the second stream of language models using a second training dataset, wherein training the multimodal question-answering model by the model training module comprises training the pre-trained first stream of language models and the pre-trained second stream of language models.

11. The computer-implemented method of claim 10, wherein the pre-training module is further configured for generating the second training dataset by:
- accessing an image and a caption of the image;
- associating an irrelevant image with the caption of the image; and
- generating an entry of the second training dataset, the entry comprising the caption of the image, the image, an indication that the image is relevant to the caption, the irrelevant image, and an additional indication indicating the caption is irrelevant to the irrelevant image.

12. The computer-implemented method of claim 5, wherein the first stream of language models comprises a plurality of transformer-based models concatenated with each other, each of the plurality of transformer-based models comprising (i) a self-attention layer using data generated by the first stream of language models as input and (ii) a cross-attention layer using data generated by both the first stream of language models and the second stream of language models as inputs.

13. The computer-implemented method of claim 12, wherein each of the plurality of transformer-based models in the first stream of language models and a second plurality of transformer-based models in the second stream of language models comprises a feedforward neural network.

14. The computer-implemented method of claim 5, wherein training the multimodal question-answering model comprises adjusting parameters of the multimodal question-answering model to minimize a loss function, wherein the loss function comprises a first term calculated for the first stream of language models and a second loss term calculated for the second stream of language models.

15. A system, comprising:
- one or more processing devices; and
- a non-transitory computer-readable medium having program code that is stored thereon, the program code executable by one or more processing devices for performing operations comprising:
  - identifying, from one or more source documents, a text passage and a plurality of images that are relevant to a query;
  - converting the text passage into a first embedding representation and the plurality of images into a second embedding representation;
  - applying, to the first embedding representation, a first stream of language models from a multimodal question-answering model to obtain an indication of a portion of the text passage that is relevant to the query;
  - applying, to the second embedding representation, a second stream of language models from the multimodal question-answering model to obtain relevance scores of the query for the plurality of images, respectively, wherein each of the first stream of language models and the second stream of language models comprises a set of transformer-based models concatenated with each other, each of the set of transformer-based models comprising a cross-attention layer using data generated by both the first stream of language models and the second stream of language models as input; and generating a response to the query comprising at least one of (a) the portion of the text passage or (b) an image among the plurality of images according to the respective relevance scores; and transmitting the response for display on a display device.

16. The system of claim 15, wherein determining the text passage and the plurality of images that are relevant to the query comprises:

determining the text passage from a text portion of the one or more source documents;

extracting multiple images from the one or more source documents;

determining a similarity between each of the multiple images and the text passage; and identifying the plurality of images that are relevant to the query as images among the multiple images having a similarity higher than a pre-determined threshold.

17. The system of claim 16, wherein determining a similarity between each of the multiple images and the text passage comprises:

generating an embedding for each of the multiple images;

generating an embedding for the text passage; and calculating the similarity as a similarity between the embedding of each of the multiple images and the embedding for the text passage.

18. The system of claim 15, wherein each of the transformer-based models in the first stream of language models further comprises a self-attention layer using data generated by the first stream of language models as an input.

19. The system of claim 15, wherein each of the transformer-based models in the first stream of language models and the second stream of language models further comprises a feedforward neural network.

* * * * *